CENTRIFUGE DISCHARGE MEANS

Original Filed Oct. 19, 1961 2 Sheets-Sheet 1

INVENTOR.
FREDERICK W. KEITH, JR.
BY Dallas T. Hoopes
ATTORNEY

CENTRIFUGE DISCHARGE MEANS

Original Filed Oct. 19, 1961 2 Sheets-Sheet 2

INVENTOR.
FREDERICK W. KEITH, JR.
BY Walter Hoopes
ATTORNEY

United States Patent Office

Re. 26,986
Reissued Nov. 24, 1970

26,986
CENTRIFUGE DISCHARGE MEANS

Frederick W. Keith, Jr., Gladwyne, Pa., assignor to Pennwalt Corporation, Philadelphia, Pa., a corporation of Pennsylvania Original No. 3,228,598, dated Jan. 11, 1966, Ser. No. 452,232, Apr. 30, 1965, which is a division of Ser. No. 146,268, Oct. 19, 1961, now Patent No. 3,192,149, dated June 29, 1965. Application for reissue Jan. 10, 1968, Ser. No. 698,983
Int. Cl. B04b *1/08, 11/00*
U.S. Cl. 233—29 10 Claims

Matter enclosed in heavy brackets [ ] appears in the original patent but forms no part of this reissue specification; matter printed in italics indicates the additions made by reissue.

*ABSTRACT OF THE DISCLOSURE*

*In a centrifuge rotor for separating a layer of solids from between respective inner and outer annular layers of light and heavy liquid, the rotor having feed means, discharge means for lighter liquid, and outlet means for heavier discharge. The outlet means is in the wall of the rotor and a restricted tubular passageway extends inwardly therefrom toward the solids-heavy liquid interface for conducting the heavy liquid and entrained solids out of the rotor from adjacent the solids-heavy liquid interface.*

This is a division of application Serial No. 146,268, filed October 19, 1961, now Patent 3,192,149.

This invention relates to centrifuge discharge means. More specifically this invention relates to centrifuge discharge means by which an intermediate layer of solids which otherwise would stick to the bowl wall may be kept spaced from the bowl wall by a liquid layer. It also provides means by which an unusually high amount of liquid may be removed from solids in the bowl.

In the prior art there has been noted in the dewaxing by centrifugation of petroleum distillate stocks the tendency of the wax solids to adhere to and to occlude quantities of the oil. This tendency results in a wax discharge with high oil content and the loss of oil. Under the present invention the wax is to a large degree separated from the oil it would otherwise occlude and the wax emerges from the process with unusual freedom from the oil. The oil, consequently, discharges in higher yield.

Another drawback of many prior art attempts at the centrifugal separation of hydrocarbon wax from oil, especially the separation of crystalline wax from oil, has been the adherence of wax solids to the walls of the centrifuge rotor, and the consequent eventual plugging of the flow channels of the rotor. The present invention overcomes this difficulty.

The present invention presents a process and apparatus applicable to the separation of hydrocarbon wax from oil It is especially useful in the removal of wax solids and will be described in connection therewith. The solids may be of crystalline nature. It should be understood, however, that the invention is capable of other applications, and is useful in the removal of amorphous wax particles from oil and generally in any centrifugal processing wherein a flowable layer is formed including solids which enclose or otherwise retain a liquid which it is desired to remove from the solids as much as possible. It is also useful in a situation in which solids would have a tendency to cling to and build up on the wall of the rotor.

This invention embodies other novel features, details of construction and arrangement of parts which are hereinafter set forth in the specification and claims, and illustrated in the accompanying drawings, wherein:

Briefly, for a solid bowl centrifuge this invention provides novel peripheral discharge means by which a layer of heavy liquid may be kept between the intermediate layer and the bowl wall. In a specific embodiment the invention includes an inward tubular extension of the centrifuge discharge nozzle.

Figure 1:
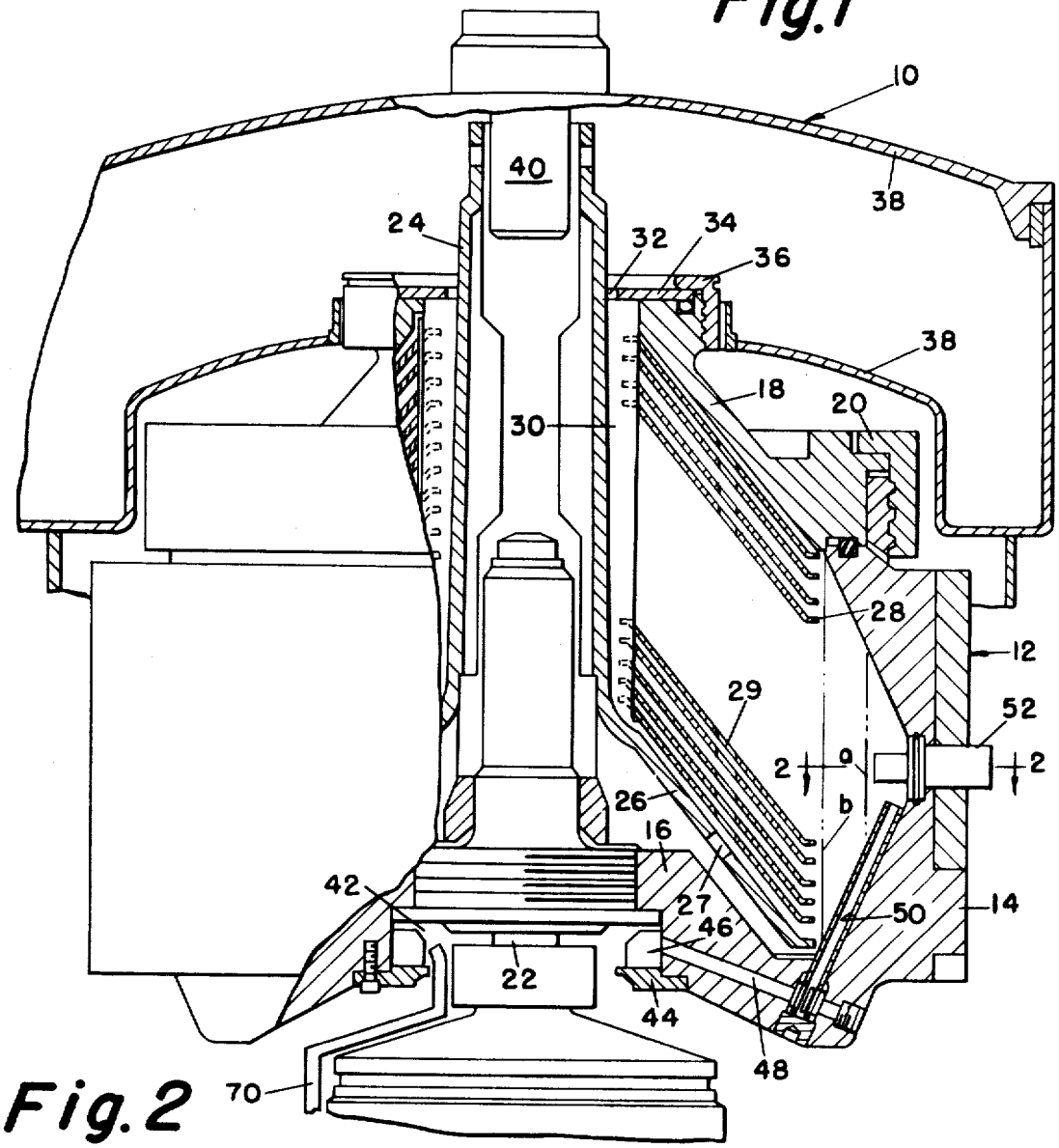
FIGURE 1 is an elevational view partly in section of a centrifuge rotor embodying one form of the invention.

In the embodiment of the invention of FIGURE 1, the centrifuge rotor illustrated is of the disc type, and is provided with a number of peripheral nozzles which permit continuous discharge therethrough. The apparatus is broadly designated 10. It comprises a rotor 12 including a shell 14 having a central hub 16 and a top 18. The top is held down against the shell by a threaded retaining element 20. The rotor is mounted on the power spindle 22, and receives center tube 24 which has its lower end disposed about the hub 16 but spaced therefrom. The lower end of the center tube flares outward into a feed distribution skirt 26 spaced from the tub and shell of the rotor. Feed openings 27 are disposed in the skirt spaced inward from the outer edge. Surrounding the center tube 24 is a nested stack 28 of spaced frusto-conical discs which extend upward to top 18 and have feed openings 29 in vertical alignment with the openings 27. Between the inner periphery of the stack 28 and the center tube 24 is an annular passage 30, and in alignment therewith is an opening 32 in top 18. A ring dam 34 is secured over opening 32 by the threaded retaining element 36. A cover 38 is provided over and about the element 36. Feed tube 40 extends into the center tube 24.

At the lower end of the rotor about the spindle 22 is an annular inwardly facing pocket 42 partially defined by a ring element 44 secured against the shell. Radially disposed accelerating vanes 46 are provided in the pocket 42. From the pocket 42 extends outward in the shell 14 the passage 48 which communicates with an upwardly directed tube 50 terminating upwardly in an opening adjacent the center of the rotor wall. A number of such passages and tubes may be circumferentially spaced about the axis of the rotor.

Figure 2:
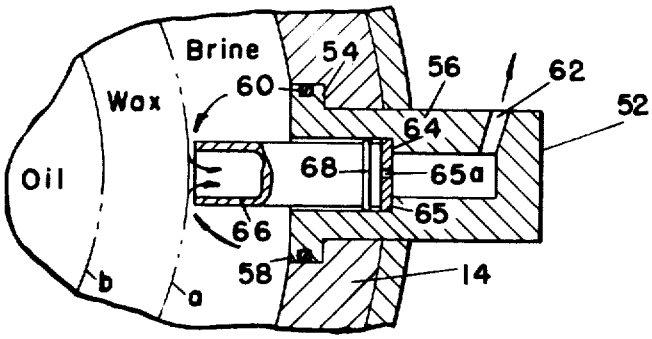
FIGURE 2 is an enlarged fragmentary sectional view taken on the line 2—2 of FIGURE 1.

A plurality of nozzle holders 52 are spaced circumferentially about the wall of shell 14 and are each set in openings formed in the wall and having a stepped structure, larger in diameter at the inside of the wall than at the outer to present a shoulder 54 (FIGURE 2). Each nozzle holder 52 is a cup-shaped element 56 having an outward flange 58 about the open end thereof. The flange 58 rests against the shoulder 54 and is grooved about its periphery to receive a sealing ring 60. The nozzle opening 62 is formed in the wall of the holder and faces rearward of the direction of rotation of the bowl. As shown in FIGURE 2 the holder 52 has its central cavity of stepped construction to present a shoulder 64. Controlling the discharge an orifice plate 65 having a central opening **65*a* of selected size may rest on shoulder 64. Received into the larger portion of cavity and abutting against the orifice plate 63 is a tube extension 66 which extends inward toward the disc stack 28. The tube extension 66 carries an annular groove which receives a sealing ring 68 to seal the juncture of extension 66 and the nozzle holder 52**.

A liquid supply line 70 is provided adjacent the base of the spindle 22 and terminates upwardly in an opening adjacent the annular inward pocket 42.

In the operation of the apparatus disclosed in FIGURES 1 and 2 the feed liquid may comprise for example a mixture of wax and oil in a solvent (such as methyl ethyl ketone). The mixture may be previously heated to permit complete solution of all wax and then chilled as is conventional to solidify the wax. This mixture is introduced through the feed tube 40 into the center tube 24, outward under skirt 28, through openings 27 and into the primary separating zone of the bowl. Brine, water, or other liquid immiscible with oil and wax and of greater density than wax is introduced by the liquid supply line 70 in excess into the pocket 42 and thereby through passage 48 and tube 50 into the rotor. The demand for the liquid flow from the pocket 42 into the bowl naturally results from the tendency of the various liquids to maintain hydrostatic balance between portions within the rotor and portions without the rotor in passage 48 and tube 50 as liquid discharges through extension 66. In this connection it should be noted that because the liquid of greater density is present in passage 48 and tube 50, the controlling edge of dam 44 may be inward of dam 34 and oil will still discharge over dam 34.

In the centrifugal field the various layers will form as indicated illustratively by the interface lines in FIGURE 1. The wax solids will concentrate and compact outward of the disc stack. Line "a" indicates the wax-brine interface while line "b" indicates the wax-oil interface which may not be sharply defied. The position of the interfaces with respect to the elements is important. Interface "a" will locate immediately inward of the inner end of the tube extension 66. The interface "b" should preferably be positioned outside the disc stack 28.

Continued introduction of feed through pipe 40 and liquid through line 70 results in the upward flow of separated oil through passage 30 and over the ring dam 34 into cover 38, and discharge of brine with entrained wax solids through the nozzle openings 62. It is important that the entrainment of wax in the discharging brine and the inner diameter of ring dam 34 be sufficient to avoid the accumulation of wax inwardly of the rotor into the disc stack 28. Such accumulation could result in the passage of wax out of the bowl with the oil discharge, defeating the primary objective of the separation. It could also result in partial or complete plugging of the disc stack 28.

The entrainment of the wax in the brine is neatly effected by the device of FIGURES 1 and 2. It has been noted that discharge through extension 66 causes wax concentrate-brine interface "a" to locate immediately inside extension 66. The brine in discharging through extension 66 will cause a shallow localized flow of brine inward of the annular end or mouth of extension 66 and in a direction substantially tangential to the interface "a" (FIGURE 2). This rapid shallow localized flow of brine will create a zone of lower pressure establishing a venturi effect and promoting entrainment of wax solids from the adjacent wax layer into the discharging brine. The movement of brine into the extension 66 eliminates the danger of the wax concentrate growing inwardly, stagnating or growing outwardly beyond the inward end of extension 66 and it eliminates all possibility of wax adhering to the wall of the rotor adjacent the nozzle holder 52.

The arrangement disclosed in FIGURES 1 and 2 provides simple means by which wax solids, especially solids of crystalline nature, may be entrained in a carrier liquid and easily discharged from a centrifuge through peripheral nozzles without danger of contacting and sticking to the wall of the rotor. Another benefit accrues. The rapid shallow localized flow of brine about the end of the extension 66 and the spilling outward of the brine into the extension 66 causes agitation of the wax solids. The agitation or turbulence is probably greatest just inside the mouth of extension 66 and disturbs the concentrate of wax solids. Individual solids so disturbed release enclosed or retained portions of oil for separate flow outward through the nozzle as droplets separated from the wax. The wax and oil so separated may be easily separately recovered after discharge by gravity settling procedures, for instance.

In addition, the rapid shallow localized flow of brine in a direction substantially tangential of the wax-brine interface causes a condition of high shear or turbulence in the wax layer thereadjacent, liberating some of the oil enclosed in wax solids for diffusion through the wax layer and discharge with the oil out through passage 30 and over ring dam 34.

Thus at least two purposes are served by the arrangement of FIGURES 1 and 2; effective discharge of the wax from the bowl, and a washing of the wax.

MODIFIED FORM

Figure 3:
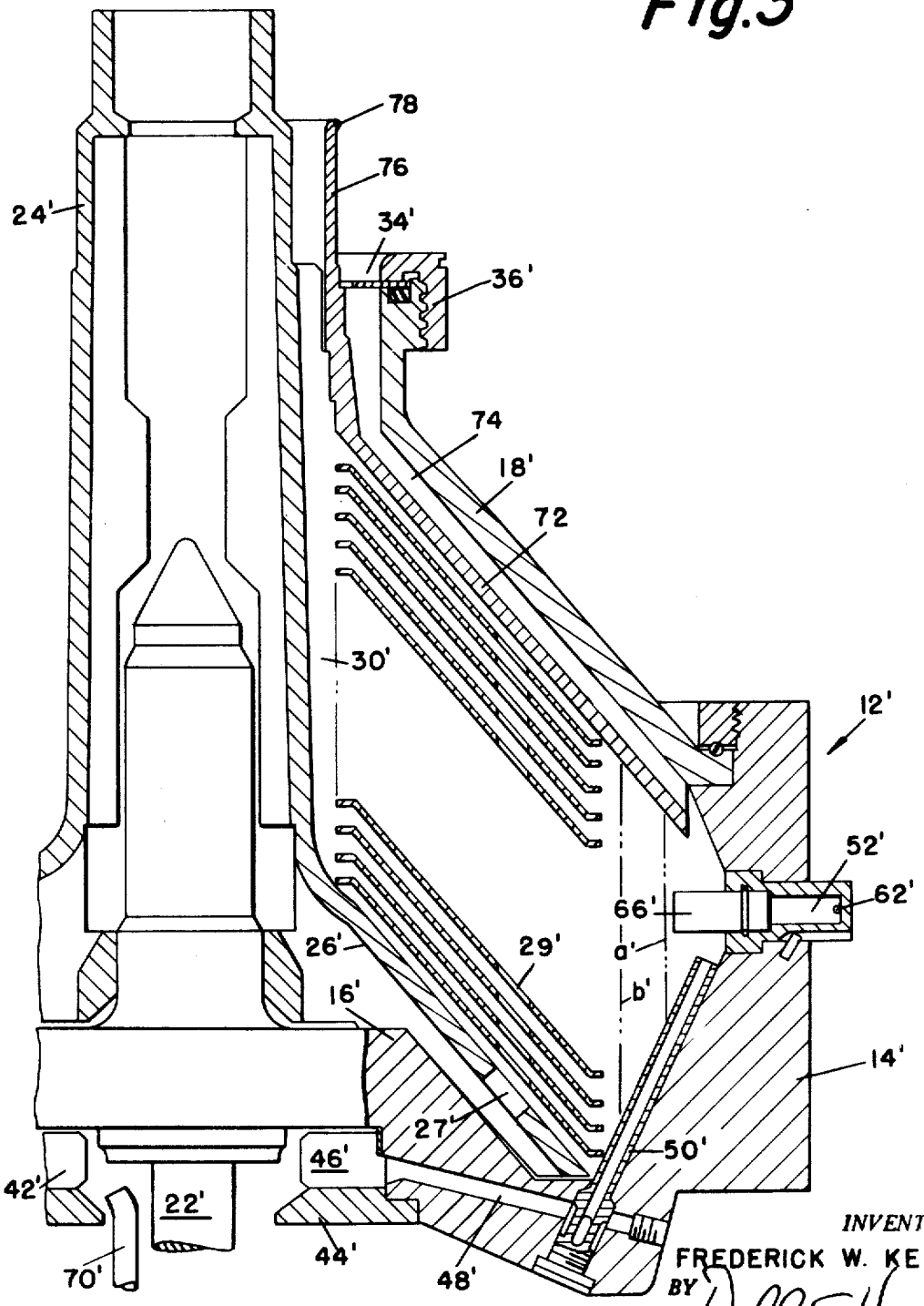
FIGURE 3 is a fragmentary sectional view of a centrifuge rotor embodying another form of the invention.

As shown in FIGURE 3 the structure of the rotor may be altered to include a dividing cone 72 disposed on the upper disc element of the disc stack 28' and spaced downward from the top 18' by a plurality of radial spacers to permit a passage 74 of liquid upward to the ring dam 34'. The upper end of the dividing cone 72 carries a longitudinal upward extension 76 spaced outwardly from center tube 24' and terminating in a discharge weir 78. As shown, the dividing cone 72 extends outward beyond the margin of the disc stack to a radius beyond the inner end of the extension 66'.

In other respects, the structure of the centrifuge bowl of FIGURE 3 is similar to that of FIGURE 1, and the primed form of the same reference numeral is used to designate corresponding parts.

In the operation of the modified form of the invention shown in FIGURE 3, feed mixture as described in connection with FIGURE 1 is fed through center tube 24', and passages 27', and brine or the like carrier liquid is fed from line 70 into the annular pocket 42'. After a period of operation the interface "a" is established by discharge of wax through extension 66. Interface "b'" which may not be sharply defined is established by ring dam 34' at a position outside the disc stack 28', and the wax concentrates compact between the interfaces "a'" and "b'." The oil discharges over weir 78 and brine, entraining wax solids discharges with benefits comparable to those of the FIGURE 1 embodiment through extension 66' and opening 62'. Excess brine passes out over ring dam 34'. Appropriate collectors for effluent over weir 78 and dam 34' respectively are provided (not shown).

In another embodiment a rotor may be used comparable to that of FIGURE 3 with pocket 42', passage 48' and tube 50' eliminated. In the operation of this modified form of the invention not only the feed mixture but also the brine or other carrier liquid is fed through the feed tube 24', under the skirt 26' through openings 27' and into the primary separating zone of the rotor. In the dewaxing process, the interfaces "a'" and "b'" establish, as the FIGURE 3 embodiment, after a period of operation, and, the brine with entrained wax solids and liberated oil discharges through the extension 66'. Excess brine passes above the dividing cone 72 through passage 74 and over the ring dam 34'. The oil moves inwardly of the rotor and discharges by way of extension 76 over weir 78. Appropriate receiving means for the various effluents are provided.

In a further variation, brine or the like may be introduced to the rotor through the opening in the ring dam 34' as disclosed for instance in the Jones Patent 2,407,834 issued September 17, 1946. In this variation the tube 50', passage 48', etc. are eliminated. The oil in solvent and wax, for example, may be introduced through center tube 24'. Operation is as with the FIGURE 3 embodiment.

EXAMPLE

The following example meant not by way of limitation but as an illustration is representative of operation of the apparatus disclosed in FIGURE 1.

A rotor as disclosed in FIGURE 1 having fifty spaced discs and four peripheral nozzles with extensions 66 extending inwardly 0.47" from the inside surface rotor wall was rotated at 10,000 r.p.m. A petroleum distillate fraction having a pour point of approximately 40° F., diluted with methyl ethyl ketone, was fed at the rate of 1 gallon per minute at 8° F. Its wax content was 6%. A supply of 1.3 to 2.5 gallons per minute of brine through line 70 caused a discharge of wax solids with the brine through nozzle extension 66. Wax at 46% to 55% oil after decanting the brine and stripping off the solvent was produced.

It should be noted that the practice of the invention is not limited to the use of oil in a solvent. Dewaxing may be accomplished on some light oils in the absence of solution in a solvent.

In all embodiments liberation of oil from the zones between the wax solids as well as the entrainment of the solids themselves by the brine flow will be facilitated by the addition of surface active agents, preferably of the ionic type, such as the commercial products known in the trade as Tergitol or the various organic-phosphorous compounds, such as sodium di-decyl phosphate as discussed in the U.S. Patent 2,793,169, which issued May 21, 1957. Such agents enable the carrier liquid to preferentially wet the wax solids, and replace the oil on the surfaces thereof.

It is contemplated that aside from the separation of wax solids from oil, the process and apparatus disclosed herein may be effectively used in the production of tall oil to assist in removal of interfacial solids such as lignin between the tall oil layer and the mineral acid layer. The invention has application in the separation of sterols and other high molecular weight solids intermediate in density between fatty acid layer and aqueous mineral acid layer resulting from the acidulation of vegetable oil soapstocks.

The invention has other applications. In general, it is particularly well adapted to the removal from a liquid-solid mixture of solids having a tendency to occlude portions of a liquid phase therebetween. It results in the liberation of much of the liquid from the solids in the solids discharge. As noted, the invention also provides for removal from a zone of centrifugation of solids otherwise having a tendency to adhere to the walls of the zone.

It is therefore to be understood that the above particular description is by way of illustration and not of limitation, and that changes, omissions, additions, substitutions and/or other modifications may be made without departing from the spirit of the invention. Accordingly it is intended that the patent shall cover, by suitable expression in the claims, the various features of patentable novelty that reside in the invention.

I claim:

1. In a centrifuge rotor having feed means, discharge means for a lighter effluent, and for a heavier discharge a peripheral outlet comprising in the wall of the rotor a radial opening having an enlarged inner portion to present an inwardly facing radial shoulder, a cup-shaped nozzle holder having discharge opening means spaced from the mouth thereof and a flange about the mouth, the holder being mounted in the opening, the closed end of the holder being the end more remote from the axis of the bowl and the flange abutting the shoulder; the improvement wherein said nozzle holder has an enlarged inner diameter in an annular zone adjacent its mouth to present at the outer end of the zone an annular shoulder spaced from the inner end of the holder; an inwardly directed tubular element, the outer end of the tubular element received snugly into the zone and abutting the annular shoulder, the inner end of the tubular element being spaced inward from the inside surface of the peripheral wall of the rotor most remote from the axis, and a sealing ring surrounding the tubular element in the annular zone to seal the connection between the tubular element and the holder, the outer end of the tubular element carrying an orifice plate to restrict flow through the tubular element.

2. The improvement of claim 1 wherein the rotor is provided exteriorly of its separating zone with an annular inwardly directed pocket having at least one opening in the outer wall thereof, and means in the rotor communicating from the opening to a second opening, the second opening being disposed in the separating zone adjacent the inside surface most remote from the axis.

*3. In a centrifuge rotor for continuously separating interfacial solids from a layer thereof between respective inner and outer layers of light and heavy liquid disposed annularly about the axis of rotation of said rotor, said centrifuge rotor having feed means, discharge means for the lighter liquid, and outlet means for heavier discharge in the wall of said rotor, that improvement including a passageway leading inwardly from said outlet means to the solids-heavy liquid interface for conducting heavy liquid and entrained solids out of said rotor.*

*4. The improvement of claim 3 wherein the inner end of said passageway is disposed adjacent and immediately outward of the solids-heavy liquid interface.*

*5. The improvement of claim 3 wherein said passageway has a restricted orifice.*

*6. The improvement of claim 3 wherein said outlet means includes a plurality of discharge nozzles spaced circumferentially about the peripheral wall of said rotor, and said passageway comprises respective inwardly extending tubular extensions of said nozzles.*

*7. The apparatus of claim 3 including a frusto-conical disc stack within said rotor and inwardly of the solids-light liquid interface, said disc stack defining a primary separating zone, and said feed means communicating with said primary separating zone.*

*8. The apparatus of claim 7 further including a dividing cone above said disc stack and spaced below the top of said rotor to provide a first passage for conducting heavy liquid between the outer layer of heavy liquid and the exterior of said bowl, there being a second inwardly extending passage at the other end of said rotor for conducting heavy liquid between the exterior of the bowl and the outer layer of heavy liquid, and a second outlet means for excess heavy liquid at one end of said rotor communicating with one of said passages.*

*9. The apparatus of claim 8 wherein the dividing cone extends outwardly to the outer layer of heavy liquid.*

*10. The apparatus of claim 8 wherein the dividing cone extends outwardly to a radius larger than the radius of the inner end of the passageway.*

References Cited

The following references, cited by the Examiner, are of record in the patented file of this patent or the original patent.

UNITED STATES PATENTS

| | | | |
|---|---|---|---|
| 2,630,268 | 3/1953 | Abbott | 233—46 XR |
| 2,917,230 | 12/1959 | Kaldewey | 233—28 |
| 1,644,492 | 10/1927 | Rawolle | 233—14 |
| 2,060,239 | 11/1936 | Peltzer | 233—47 |
| 2,265,459 | 12/1941 | Strezynski | 233—29 |
| 2,695,748 | 11/1954 | Millard | 233—47 |
| 3,047,214 | 7/1962 | Downing | 233—14 |
| 3,081,028 | 3/1963 | Steinacker | 233—20 |

FOREIGN PATENTS

| | | |
|---|---|---|
| 284,578 | 6/1915 | Germany. |
| 896,176 | 11/1953 | Germany. |
| 352,645 | 7/1931 | Great Britain. |

HENRY T. KLINKSIEK, Primary Examiner

U.S. Cl. X.R.

233—14, 46